United States Patent
Azarian Yazdi et al.

(10) Patent No.: US 10,568,161 B2
(45) Date of Patent: Feb. 18, 2020

(54) UPLINK (UL)-BASED MOBILITY VIA IMMEDIATE AND DELAYED KEEP ALIVE (KA) SIGNALS

(71) Applicant: QUALCOMM Incorporated, San Diego, CA (US)

(72) Inventors: Kambiz Azarian Yazdi, San Diego, CA (US); Tingfang Ji, San Diego, CA (US); Haitong Sun, Sunnyvale, CA (US); Gavin Bernard Horn, La Jolla, CA (US); Keiichi Kubota, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/719,492

(22) Filed: Sep. 28, 2017

(65) Prior Publication Data

US 2018/0092159 A1    Mar. 29, 2018

Related U.S. Application Data

(60) Provisional application No. 62/401,742, filed on Sep. 29, 2016.

(51) Int. Cl.
*H04W 76/04*  (2009.01)
*H04W 76/28*  (2018.01)
(Continued)

(52) U.S. Cl.
CPC ........... *H04W 76/28* (2018.02); *H04L 67/145* (2013.01); *H04W 72/12* (2013.01); *H04W 8/02* (2013.01); *H04W 88/02* (2013.01)

(58) Field of Classification Search
CPC ..... H04W 76/048; H04W 72/12; H04W 8/02; H04W 88/28; H04W 76/25; H04W 88/02;
(Continued)

(56) References Cited

U.S. PATENT DOCUMENTS

| | | | |
|---|---|---|---|
| 2011/0130141 A1* | 6/2011 | Frost | H04W 60/02 455/436 |
| 2012/0309435 A1* | 12/2012 | Demaj | H04W 68/02 455/458 |

(Continued)

FOREIGN PATENT DOCUMENTS

GB    2450167 A    12/2008

OTHER PUBLICATIONS

International Search Report and Written Opinion—PCT/US2017/054332—ISA/EPO—dated Jan. 8, 2018.
(Continued)

*Primary Examiner* — Jung Liu
(74) *Attorney, Agent, or Firm* — Patterson & Sheridan, L.L.P.

(57) ABSTRACT

Aspects of the present disclosure provide methods and apparatus for improving UL-based mobility. As described herein, a UE may determine it has failed to decode a first keep alive (KA) signal during a wake period of a discontinuous receive (DRx) cycle and may extend the wake period to monitor for a second KA signal, in response to the determination. An access network controller may select, while a (UE) is currently served by a first transmit/receive point (TRP), a second TRP to serve the UE, configure the first TRP to transmit a first keep alive (KA) signal, in response to a chirp signal received from the UE, and configure the second TRP to transmit a second KA signal after the first KA signal transmitted by the first TRP.

20 Claims, 12 Drawing Sheets

(51) Int. Cl.
*H04L 29/08* (2006.01)
*H04W 72/12* (2009.01)
*H04W 8/02* (2009.01)
*H04W 88/02* (2009.01)

(58) Field of Classification Search
CPC ......... H04W 52/0225; H04W 52/0216; H04W 72/042; H04W 76/28; H04L 67/145; Y02D 70/1262; Y02D 70/1222; Y02D 70/00; Y02D 70/1242; Y02D 70/1264; Y02D 70/1246; Y02D 70/1244; Y02D 70/24

See application file for complete search history.

(56) References Cited

U.S. PATENT DOCUMENTS

| | | | | |
|---|---|---|---|---|
| 2013/0064151 A1* | 3/2013 | Mujtaba | ............... | H04B 7/0817 370/311 |
| 2014/0321416 A1* | 10/2014 | Pragada | ............... | H04W 88/04 370/329 |
| 2014/0355473 A1* | 12/2014 | Edara | .................... | H04W 76/28 370/252 |
| 2015/0003311 A1* | 1/2015 | Feuersaenger | .... | H04W 52/0225 370/311 |
| 2015/0173122 A1* | 6/2015 | Schliwa-Bertling | ........................ | H04W 56/00 370/311 |
| 2015/0282177 A1* | 10/2015 | Dong | .................. | H04L 43/0811 370/329 |
| 2015/0359034 A1* | 12/2015 | Kim | ....................... | H04W 76/28 370/328 |
| 2016/0066242 A1* | 3/2016 | Su | ......................... | H04W 36/30 455/436 |
| 2017/0094710 A1* | 3/2017 | Nirantar | ................ | H04W 76/25 |
| 2018/0092159 A1* | 3/2018 | Azarian Yazdi | ...... | H04W 76/28 |

OTHER PUBLICATIONS

Qualcomm Incorporated, "High Speed Mobility Performance Evaluations", 3GPP Draft, R1-166393, High Speed Mobility Performance Evaluations, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 9 pages, XP051125355, Retrieved from the Internet: URL:http://www.3gpp.org/ftp/Meetings3GPPSYNC/RAN1/Docs/ [retrieved on Aug. 21, 2016].

* cited by examiner

UPLINK (UL)-BASED MOBILITY VIA IMMEDIATE AND DELAYED KEEP ALIVE (KA) SIGNALS

CROSS-REFERENCE TO RELATED APPLICATIONS

This application claims benefit of priority from commonly-owned U.S. Provisional Application Ser. No. 62/401,742, filed on Sep. 29, 2016, entitled "IMPROVING UL-BASED MOBILITY VIA IMMEDIATE AND DELAYED KA," which is expressly incorporated herein by reference in its entirety.

INTRODUCTION

The present disclosure relates to wireless communication and, more particularly, to improving UL-based mobility using a first keep alive (KA) (e.g., an immediate KA) and, in certain scenarios, a second KA (e.g., delayed KA).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Certain aspects of the present disclosure provide a method for wireless communication by a user equipment (UE). The method generally includes determining the UE has failed to decode a first keep alive (KA) signal during a wake period of a discontinuous receive (DRx) cycle, and extending the wake period to monitor for a second KA signal, in response to the determination.

Certain aspects of the present disclosure provide a method for wireless communication by an access network controller (ANC). The method generally includes selecting, while a user equipment (UE) is (currently) served by a first transmit/receive point (TRP), a second TRP to serve the UE; configuring the first TRP to transmit a first keep alive (KA) signal, in response to a chirp signal received from the UE; and configuring the second TRP to transmit a second KA signal after the first KA signal transmitted by the first TRP.

Certain aspects of the present disclosure provide an apparatus for wireless communication by a user equipment (UE). The apparatus generally includes means for determining the UE has failed to decode a first keep alive (KA) signal during a wake period of a discontinuous receive (DRx) cycle, and means for extending the wake period to monitor for a second KA signal, in response to the determination.

Certain aspects of the present disclosure provide an apparatus for wireless communication by an access network controller (ANC). The apparatus generally includes means for selecting, while a user equipment (UE) is (currently) served by a first transmit/receive point (TRP), a second TRP to serve the UE; means for configuring the first TRP to transmit a first keep alive (KA) signal, in response to a chirp signal received from the UE; and means for configuring the second TRP to transmit a second KA signal after the first KA signal transmitted by the first TRP.

Certain aspects of the present disclosure provide an apparatus for wireless communication by a user equipment (UE). The apparatus includes at least one processor and a memory coupled to the at least one processor. The at least one processor is configured to determine the UE has failed to decode a first keep alive (KA) signal during a wake period of a discontinuous receive (DRx) cycle, and extend the wake period to monitor for a second KA signal, in response to the determination.

Certain aspects of the present disclosure provide an apparatus for wireless communication by an access network controller (ANC). The apparatus generally includes at least one processor and a memory coupled to the at least one processor. The at least one processor is configured to select, while a user equipment (UE) is (currently) served by a first transmit/receive point (TRP), a second TRP to serve the UE; configure configuring the first TRP to transmit a first keep alive (KA) signal, in response to a chirp signal received from the UE; and configure the second TRP to transmit a second KA signal after the first KA signal transmitted by the first TRP.

Certain aspects of the present disclosure provide a computer readable medium for wireless communication that may be performed, for example, by a UE. The computer readable medium has instructions stored thereon for determining the UE has failed to decode a first keep alive (KA) signal during a wake period of a discontinuous receive (DRx) cycle, and extending the wake period to monitor for a second KA signal, in response to the determination.

Certain aspects of the present disclosure provide a computer readable medium for wireless communication that may be performed, for example, by an access network controller (ANC). The computer readable medium has instructions stored thereon for selecting, while a user equipment (UE) is (currently) served by a first transmit/receive point (TRP), a second TRP to serve the UE; configuring the first TRP to transmit a first keep alive (KA) signal, in response to a chirp signal received from the UE; and configuring the second TRP to transmit a second KA signal after the first KA signal transmitted by the first TRP.

Aspects generally include methods, apparatus, systems, computer readable mediums, and processing systems, as substantially described herein with reference to and as illustrated by the accompanying drawings.

Other aspects, features, and examples of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
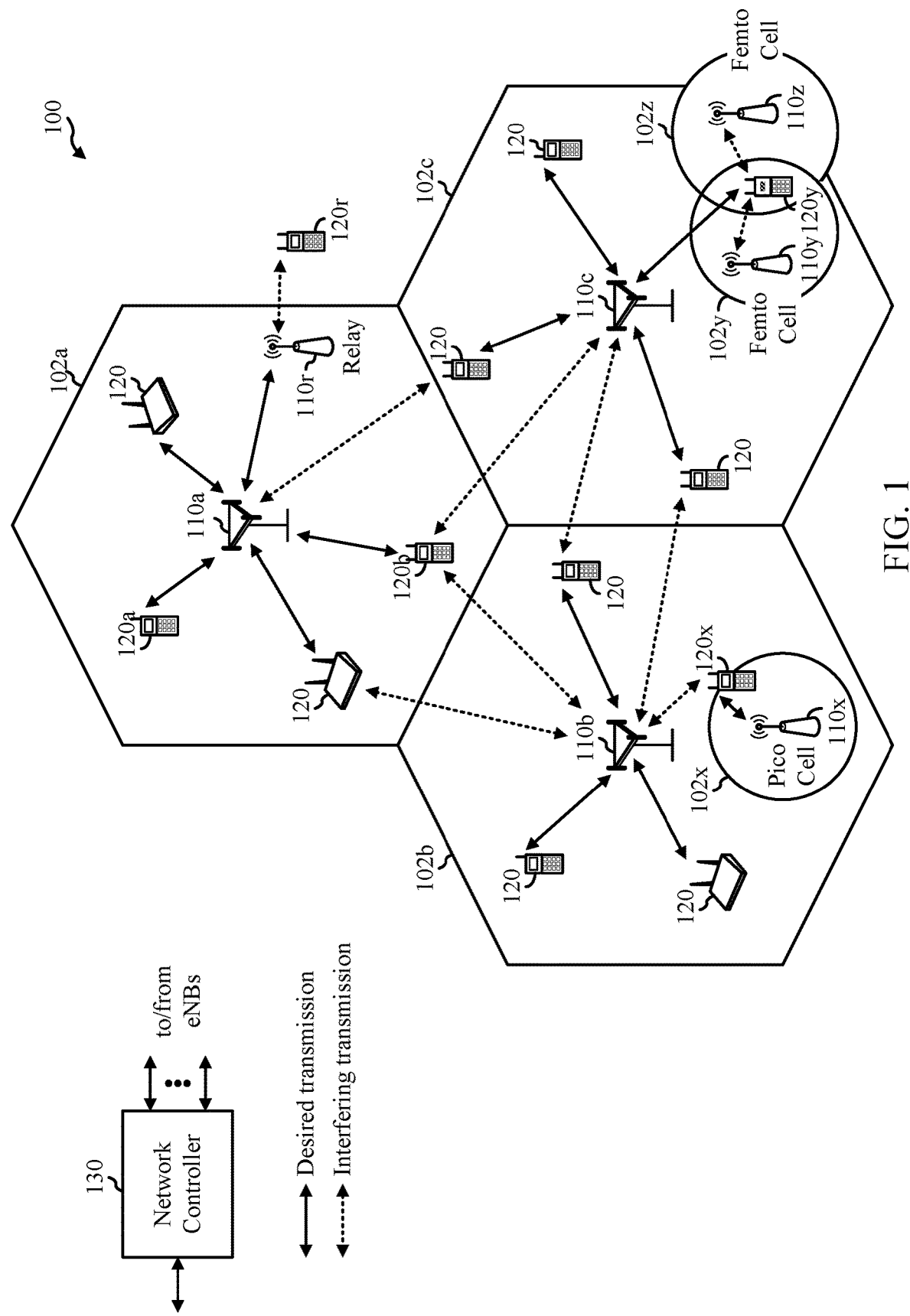
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). As will be described in more detail herein, UL-based mobility may be improved by sending a first, immediate KA and in certain scenarios, a second delayed KA. The second KA may be transmitted by a different TRP than the first KA. As an example, the second KA may be transmitted by an updated, serving TRP.

NR may support various wireless communication services, such as Enhanced mobile broadband (eMBB) targeting wide bandwidth (e.g., 80 MHz beyond), millimeter wave (mmW) targeting high carrier frequency (e.g., 27 GHz or beyond), massive MTC (mMTC) targeting non-backward compatible MTC techniques, and/or mission critical techniques targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a NR or 5G network. The UEs 120 and BSs (e.g., TRPs) 110, which may comprise a transmission reception point (TRP) may be configured to perform aspects discussed in more detailed herein for improving UL-based mobility in a wireless communication system. As will be described in more detail herein, an access network controller (ANC) may mange one or more TRPs.

The UE 120 may be configured to perform the operations and features described and illustrated with reference to FIGS. 9-13. The ANC (e.g., 202) and one or more TRPs 110, 208 may be configured to perform the operations and features described and illustrated with reference to FIGS. 9-13. According to aspects, the ANC may be part of the network controller and/or may be implemented at a TRP or a BS.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
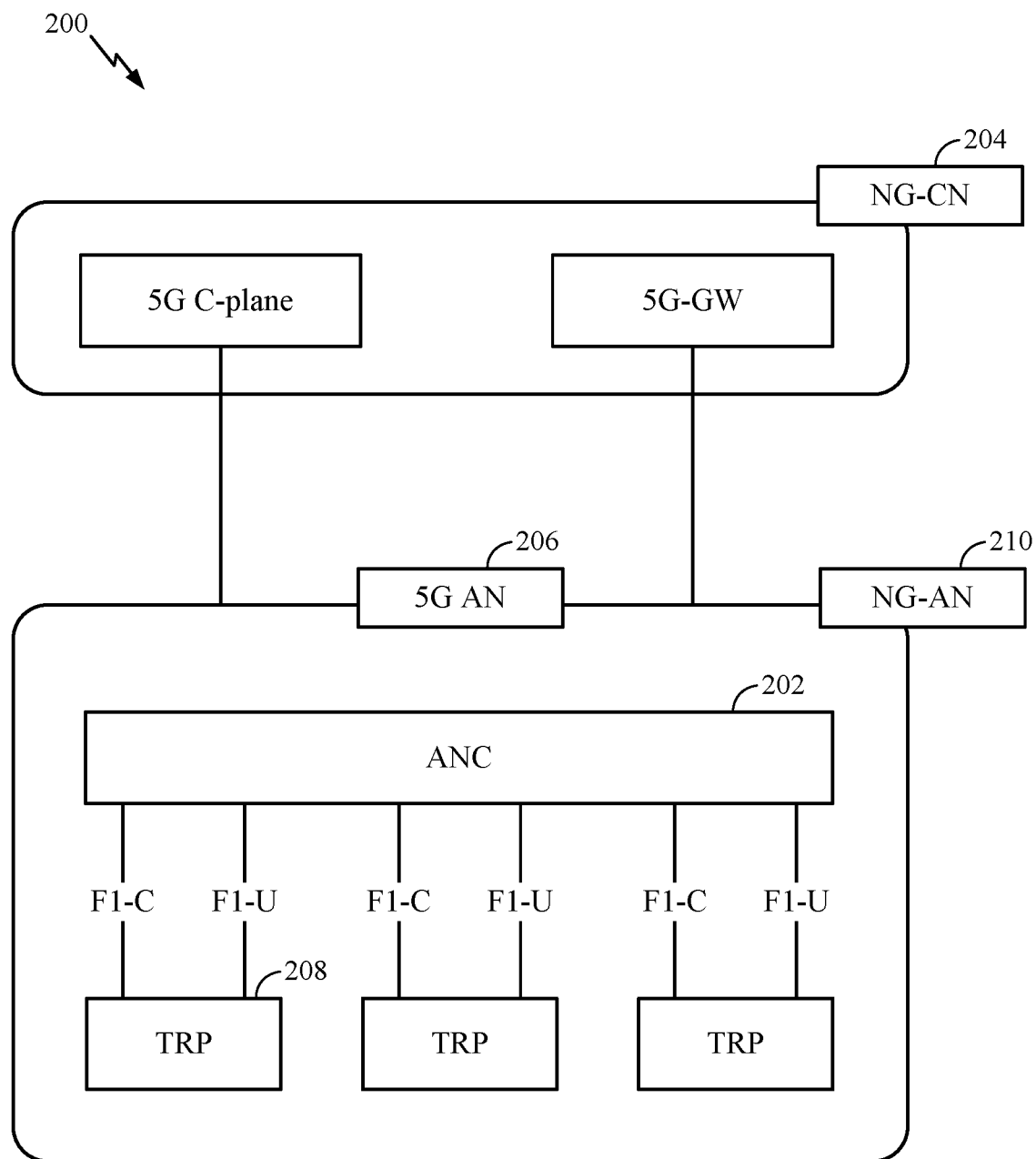
FIG. 2 is a block diagram illustrating an example logical architecture of a distributed RAN, in accordance with certain aspects of the present disclosure.

FIG. 2 illustrates an example logical architecture of a distributed RAN 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
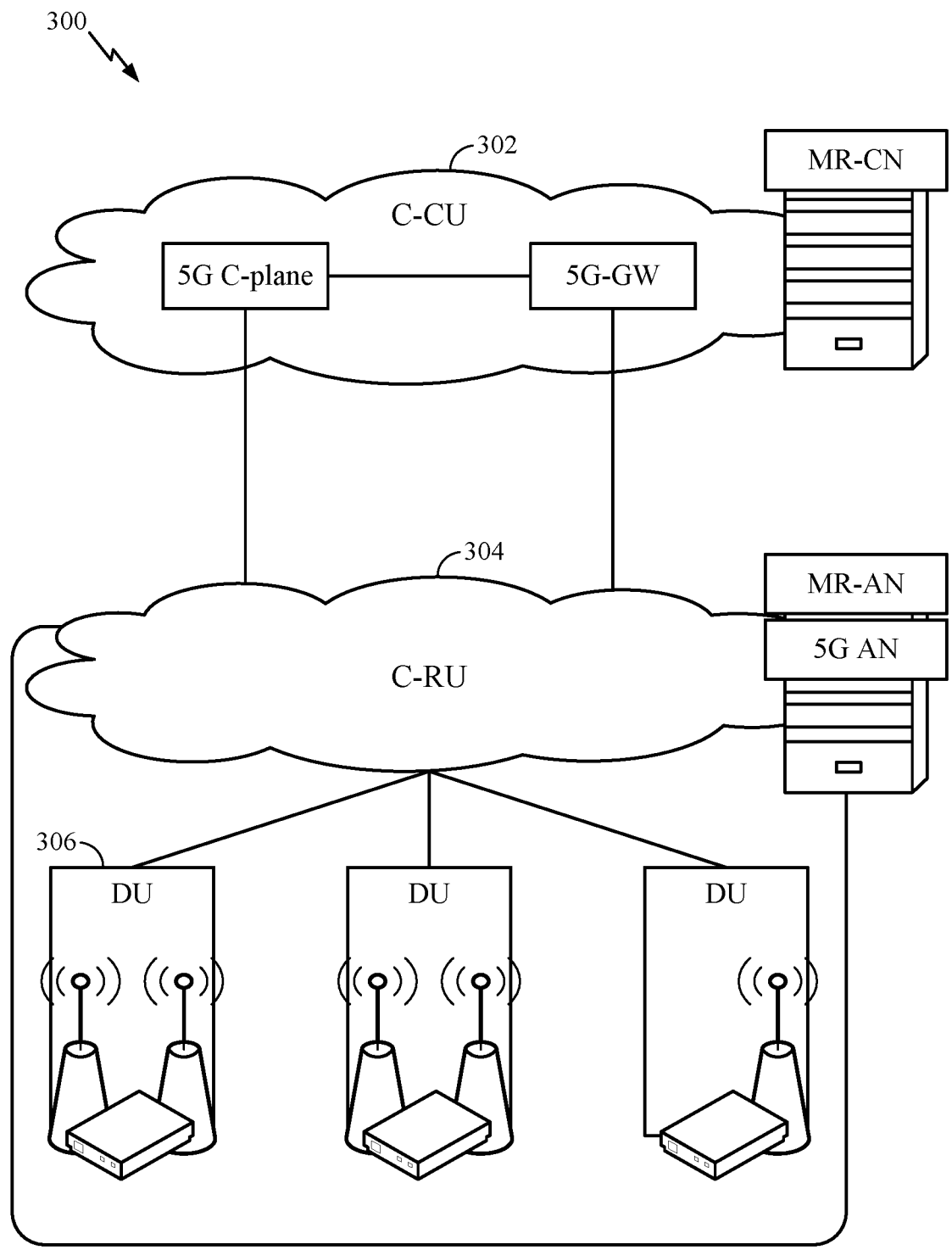
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
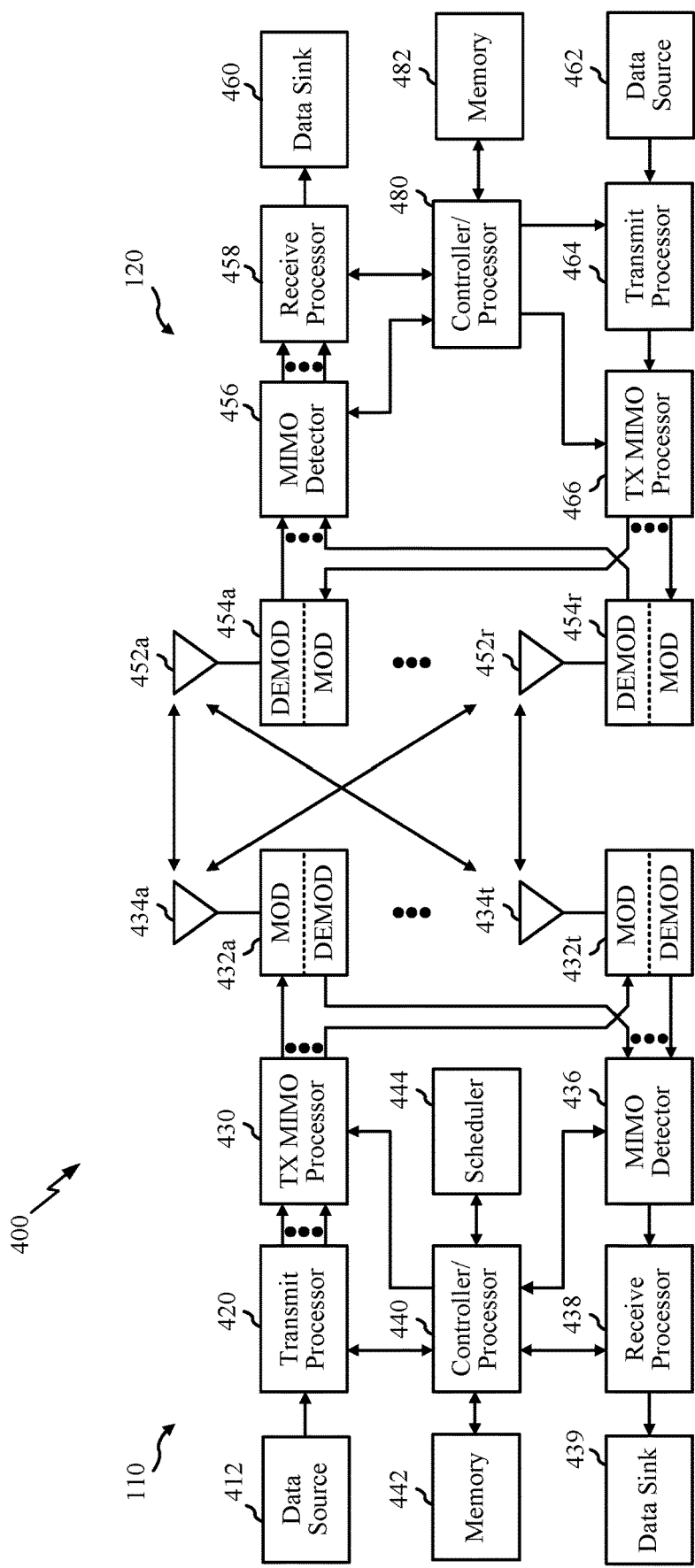
FIG. 4 is a block diagram conceptually illustrating a design of an example TRP and user equipment (UE), in accordance with certain aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 454, processors 458, 464, 466, and/or controller/processor 480 of the UE 120 and/or antennas 434, processors 420, 430, 438, and/or controller/processor 440 of the BS 110 may be used to perform the operations described herein and illustrated with reference to FIGS. 9-13. The BS 110 may comprise a TRP. The BS/TRP 110 may be managed by an ANC (e.g., 202).

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 9-13, and/or other processes for the techniques described herein.

According to aspects, the BS may include an ANC. According to aspects, the ANC may be external to one or more of the BSs. In the case where the ANC is a separate entity from the BS 110, (e.g., part of the network controller 130), the ANC (FIG. 2, 202) may include components similar to the BS 110 as illustrated in FIG. 4. In such cases, one or more processors, transceivers (mod/demod), and antennas, in combination with a memory configured to store instructions thereon at the ANC may be configured to perform the features described herein.

The memories 442 and 482 may store data and program codes for the base station 110 and the UE 120, respectively. A scheduler 444 may schedule UEs for data transmission on the downlink and/or uplink.

Figure 5:
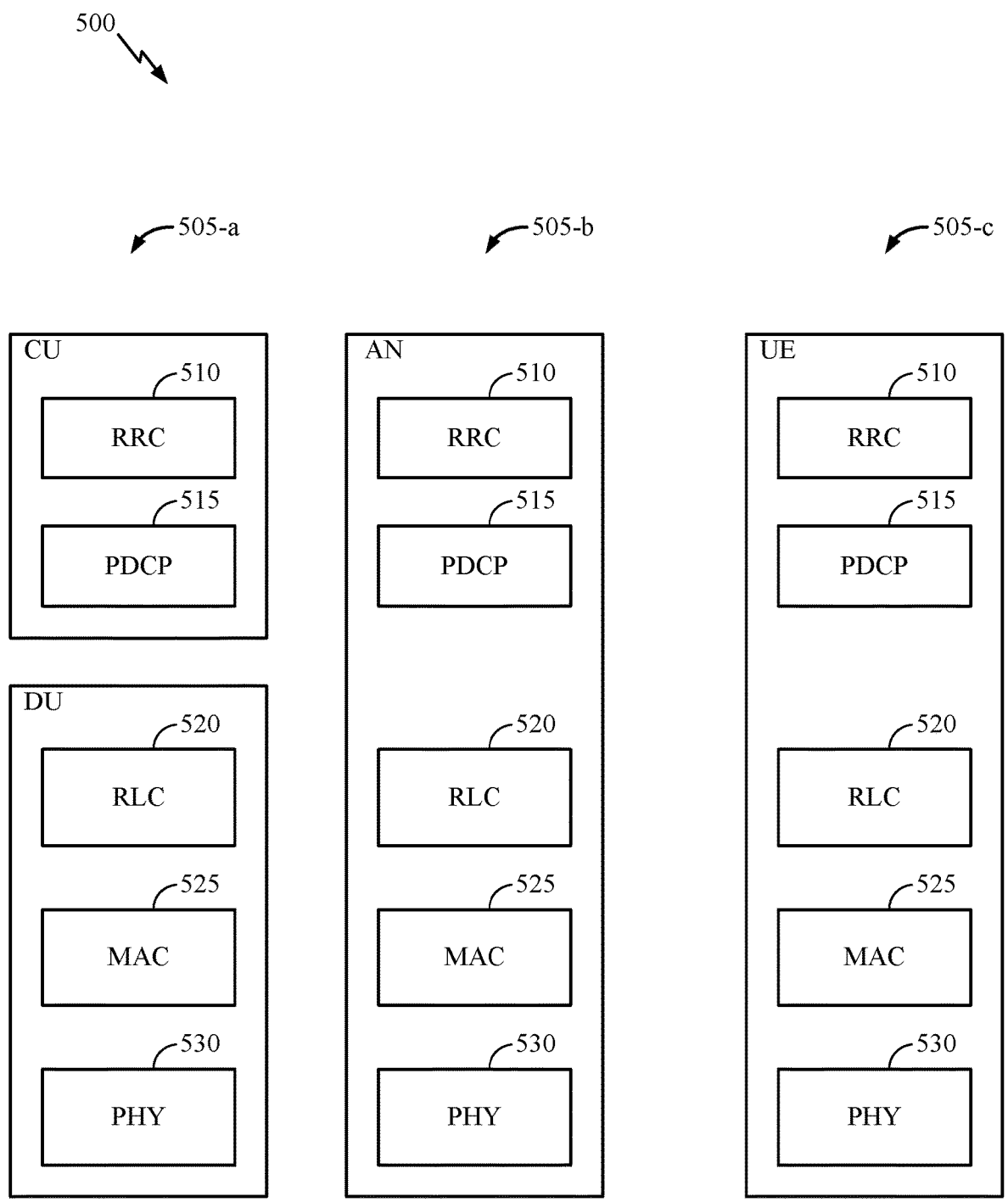
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530) as shown at 505-c.

Figure 6:
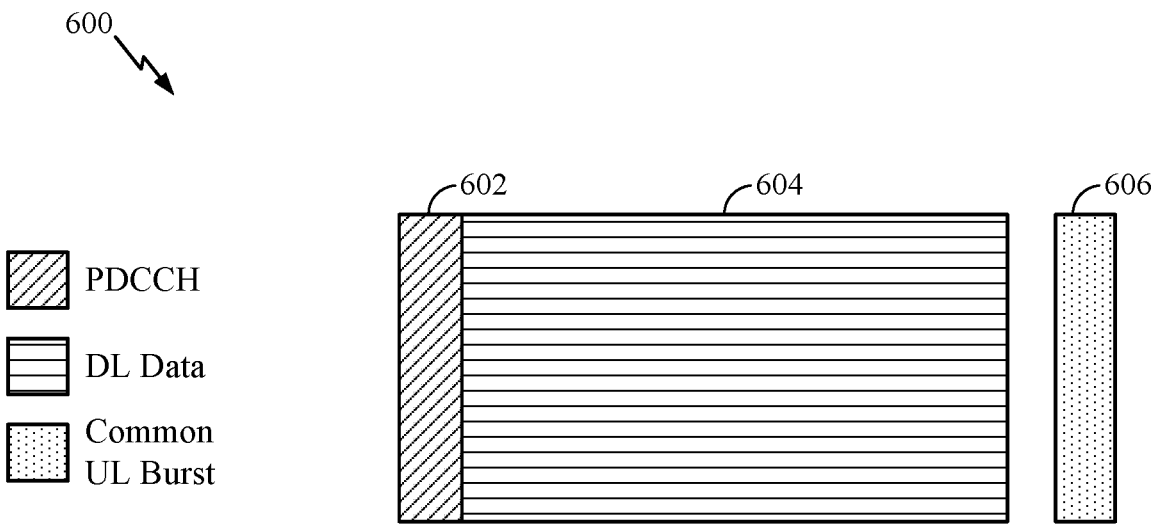
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
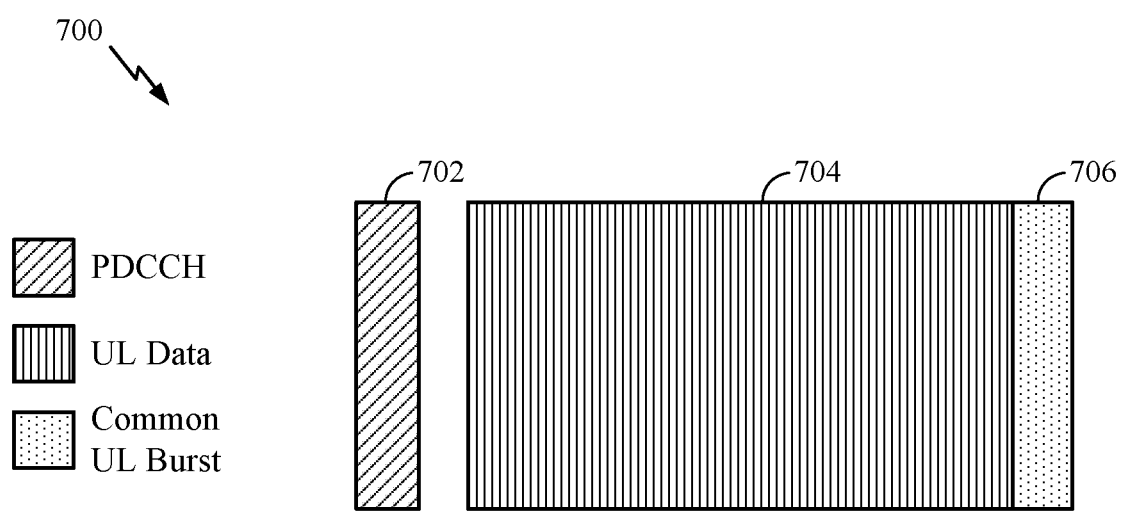
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
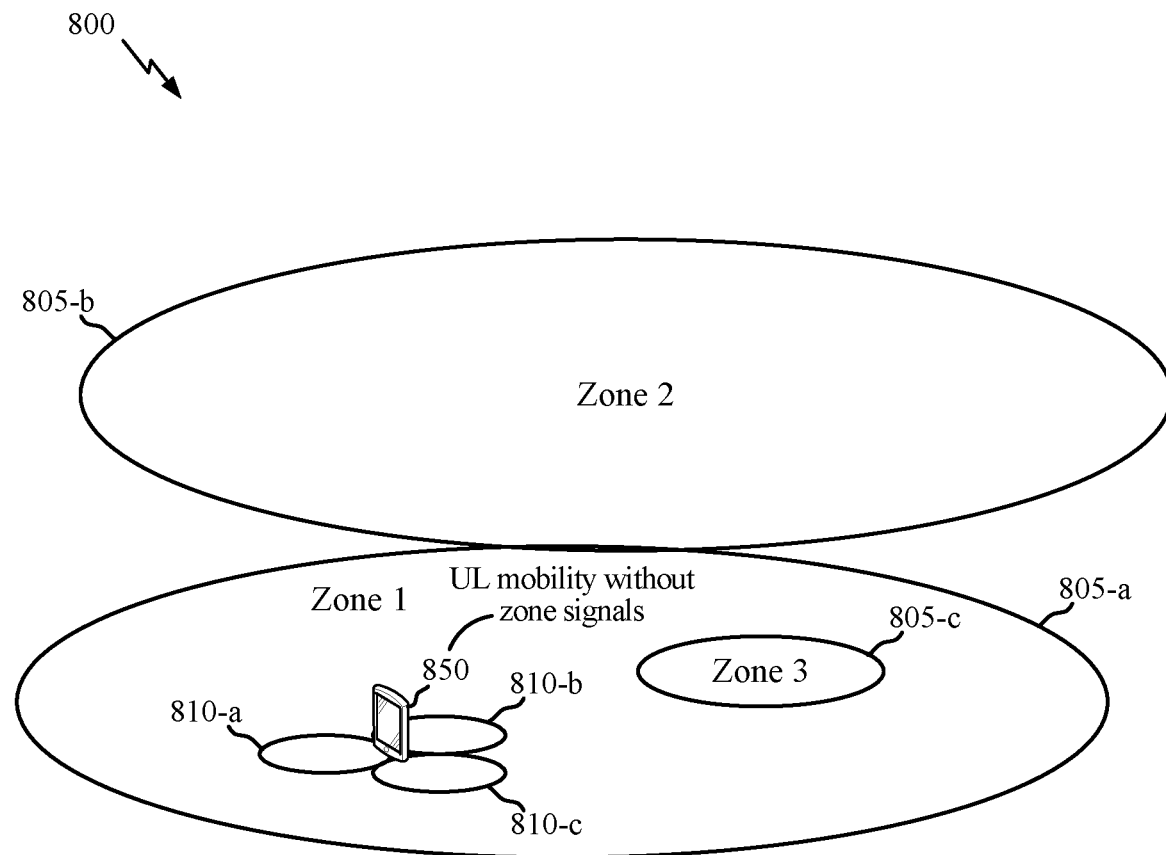
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 805-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

Immediate and Delayed KAs

In legacy wireless communication systems, a base station may transmit a reference signal. The UE may search for and measure the DL reference signal and perform cell selection. In certain scenarios such as on a high-speed train or in a dense deployment of wireless networks, a UE may use energy and resources waking-up, measuring DL reference signals, and searching for a cell.

User-centric communication systems may be based on UL-based mobility. In UL-based mobility, a UE transmits an UL reference signal, which may be referred to as a chirp signal. The network (e.g., BS, TRPs, etc.) may perform measurements on the chirp signal and may search for an appropriate serving cell for the UE based, at least in part, on the measurements.

UL-based mobility may improve (e.g., extend) the battery life of the UE, assuming that transmitting UL chirp signal consumes less power as compared to additional UE wake-ups and cell-searching. In certain highly-mobile or dense deployment scenarios, UL-based mobility may result in better reliability in terms of paging and hand-off as compared to DL-based mobility. Accordingly, it may be advantageous to improve UL-based mobility.

Figure 9:
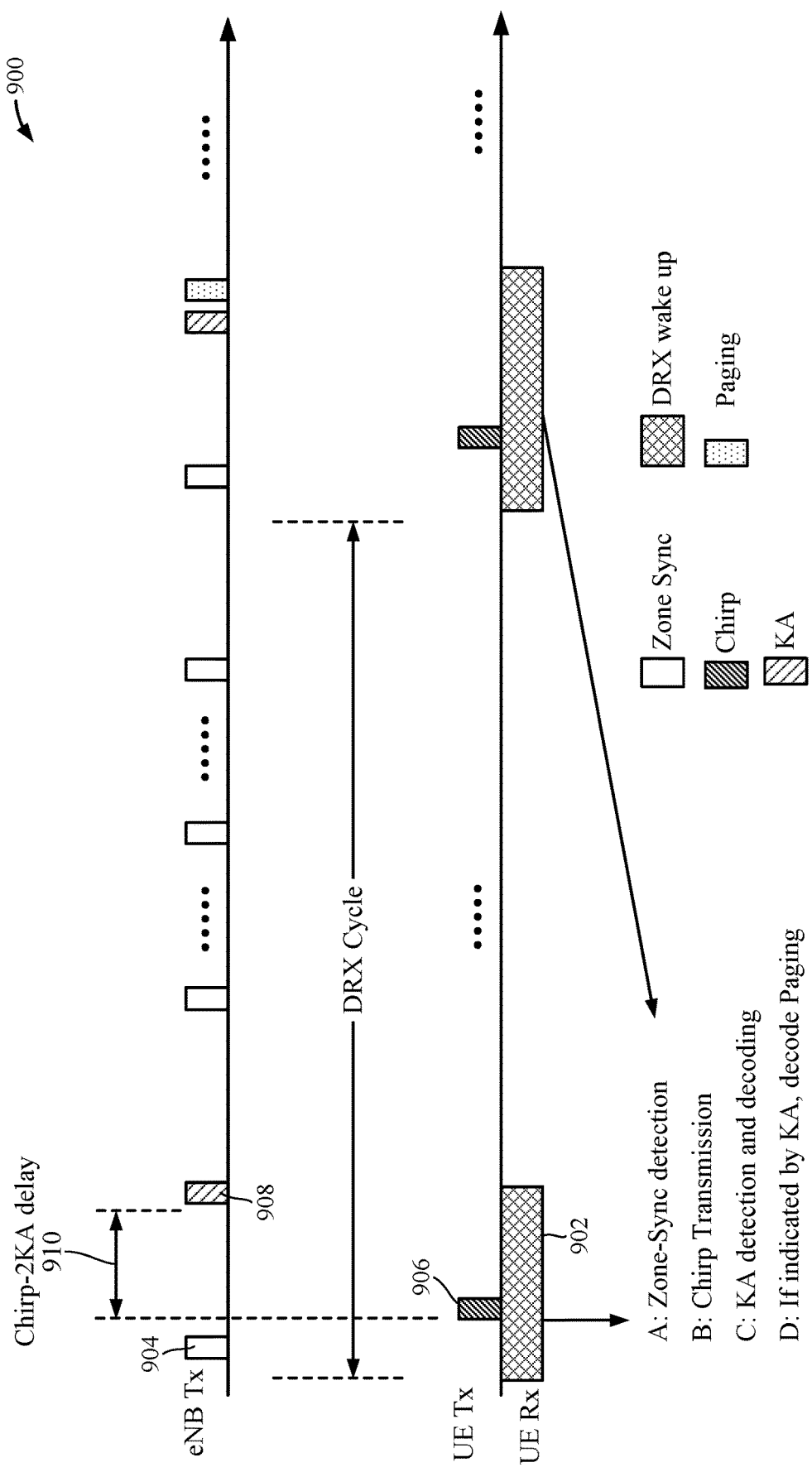
FIG. 9 illustrates an example for UE operation during discontinuous receive (DRx) wake-ups without paging, according to aspects of the present disclosure.

FIG. 9 illustrates an example 900 for UE operation during discontinuous receive (DRx) wake-ups without paging, according to aspects of the present disclosure. The eNB shown in FIG. 9 may include a TRP (e.g., TRP 208).

At 902, the UE may be in a wake period of a DRx cycle. Accordingly, the UE may wake-up and detect a zone synchronization signal 904. Examples of zone synchronization signals include a zone PSS, zone SSS, etc. The UE may use the zone synchronization signal to resynchronize to the zone and/or perform measurements on the zone synchronization signals. UE may measure the zone synchronization signal 904 in an effort to determine if the UE is located in the zone or if the UE has moved into another zone. A zone may refer to a group of TRPs managed by an ANC (e.g., a zone may include the three TRPs 208 illustrated in FIG. 2, managed by the ANC 202).

The zone synchronization signal 904 may also be used for open loop power control for a future chirp transmission 906. For example, based on measuring the zone synchronization signal 904, the UE may determine it is close to a TRP (based on a high SNR of the measured zone synchronization signal 904). In response, the UE may transmit a chirp signal 906 at a lower transmit power as compared to if the UE measured a weaker zone synchronization signal.

In response to the chirp signal 906, one or more entities in the network may select a TRP that is appropriate for serving the UE. The selection may be based, at least in part, on pathloss between the UE and a selected TRP. At 908, a TRP may transmit a keep alive (KA) signal to the UE. The UE may decode a paging channel when the KA 908 carries a page intended for the UE. A time delay 910 exists between the UE transmitting an uplink chirp signal 906 and the network transmitting a KA 908 in response to the chirp signal. The UE may receive the KA 908 because the KA is transmitted during the wake period of a UE's DRx cycle 902.

With reference to FIG. 2, the RAN may include one or more ANCs. Each ANC may manage (e.g., oversee) a number of TRPs (e.g., BS, SRH). As described above, a zone may include a number of TRPs controlled by a same ANC. A subset of TRPs controlled by the ANC may monitor an UL chirp signal transmitted by the UE. The subset may be referred to as a "monitoring set." The monitoring set may measure the chirp signal and may transmit a measurement report to the ANC.

If the signal quality associated with the chirp signal exceeds a threshold at a serving TRP, the serving TRP may transmit a KA (at 908) without involvement from the ANC. If the signal quality associated with the chirp signal does not exceed a threshold, the ANC may select a new serving TRP for the UE. The new serving TRP may transmit a KA to the UE (at 908). ANC involvement may increase the delay (e.g., 910) between the UE sending the chirp signal and the network transmitting the KA. For example, the delay may occur if the network front-haul (connections between ANC and TRP) is not fiber-based (e.g., few millisecond added delay).

Figure 10:
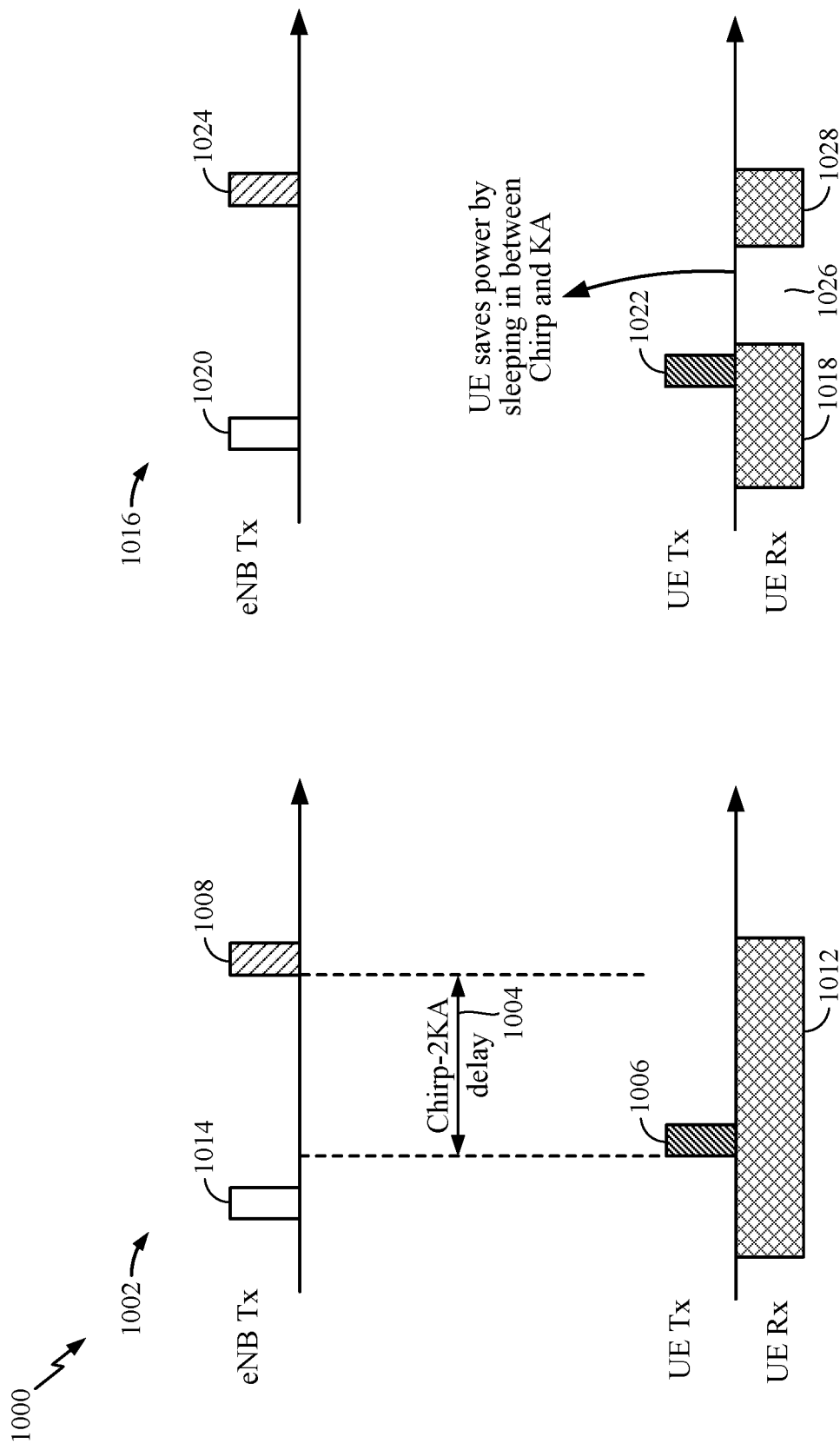
FIG. 10 illustrates examples illustrating the delay between a chirp signal and KA, according to aspects of the present disclosure.

FIG. 10 illustrates examples 1000 illustrating the delay between a chirp signal and KA ($T_{chirp-2KA\ delay}$).

In example 1002, similar to FIG. 9, in a wake period 1012 of a DRx cycle, the UE may detect a zone synchronization signal 1014 and may transmit an uplink chirp signal 1006. The uplink chirp signal may be transmitted after the UE synchronizes to the network. In example 1002, the $T_{chirp-2KA\ delay}$ 1004 between the UL chirp 1006 and the DL KA 1008 is not very large. Accordingly, the UE may stay away during the delay 1004 without degrading UE power.

In example 1016, similar to FIG. 9, in a wake period 1018 of a DRx cycle, the UE may detect a zone synchronization signal 1020 and may transmit an uplink chirp signal 1022 after synchronizing with the network. In example 1016, the $T_{chirp-2KA\ delay}$ between the UL chirp 1022 and the DL KA 1024 is large enough (e.g., 5 ms or 10 ms) that the UE may save power by sleeping between the chirp signal 1022 and the KA signal 1024. Thus, at 1026, the UE may go to sleep. During a wake period 1028 of the DRx cycle, the UE may wake up to receive the KA signal 1024.

In certain scenarios, the $T_{chirp-2KA\ delay}$ is not short or long, but an in between length. For example, the UE remaining awake to receive the KA may consume too much power, and the delay between the chirp and the KA is not large enough to justify energy overhead for UE to go back to sleep and wake up again. In an effort to conserve power at a UE, according to aspects, in certain scenarios, the network may help a UE save power by transmitting an "immediate KA" signal followed by "delayed KA" signal. The immediate KA may be transmitted by the cell that was most-recently selected by the ANC to serve the UE. The delayed KA may be transmitted by the updated serving cell, after the handover. Therefore, if the UE is handed over, two KAs may be transmitted.

As will be described in more detail herein, a UE may transmit a chirp signal. A serving TRP may transmit a first, immediate KA signal in response to the chirp signal. The UE may go back to sleep if it decodes the first, immediate, KA signal. If the UE does not decode the first KA signal, the UE may extend its wake cycle and in effort to decode the second KA signal. The second KA signal may be transmitted by an updated (different) TRP.

The ANC may select an updated serving TRP for the UE if the ANC determines the UE should be handover to another TRP in the zone. For example, the ANC may receive measurement reports from TRPs reporting the signal strength associated with the UL chirp signal transmitted by the UE. Based on these measurements, the ANC may select a new serving TRP for the UE. The updated TRP may transmit the second, delayed KA signal. Accordingly, the UE may only extend its wake cycle if it did not decode the first KA signal. This shortens the UE's wake time and saves power at the UE.

Figure 11:
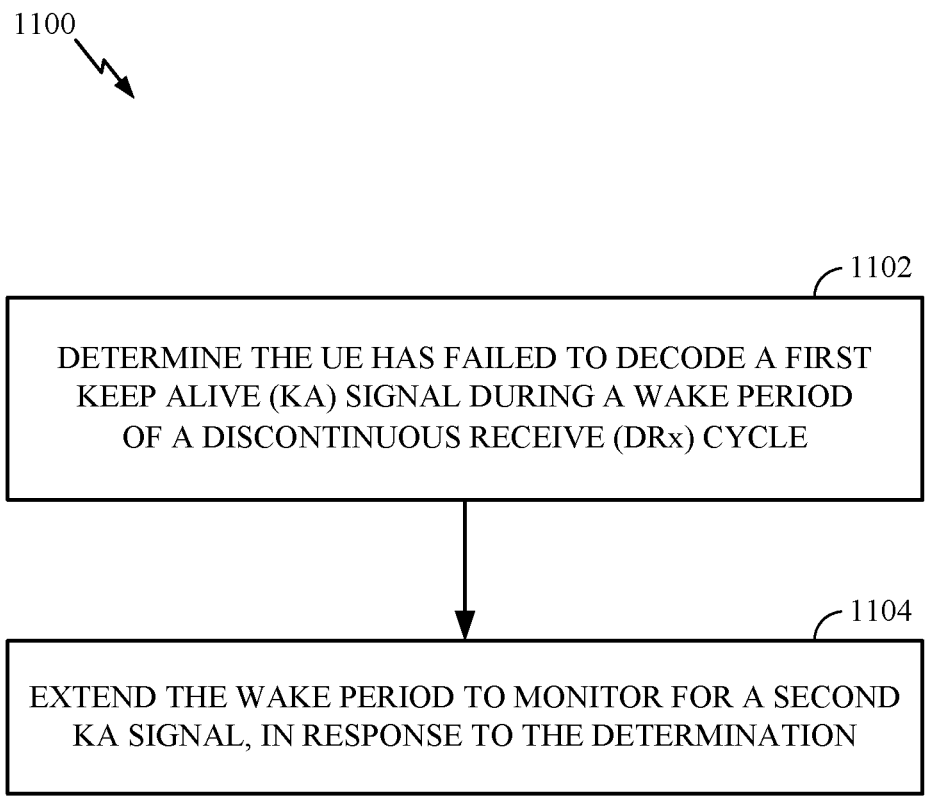
FIG. 11 illustrates example operations, which may be performed by a UE, in accordance with aspects of the present disclosure.

FIG. 11 illustrates example operations 1100 which may be performed by a UE, in accordance with aspects of the present disclosure. The UE may include one or more components as illustrated in FIG. 4. As an example, one or more of the antenna 452, demod/mod 454, processors 458, 466, and 464, and the controller/processor 480 may be configured to perform the described steps.

At 1102, the UE may determine the UE has failed to decode a first keep alive (KA) signal during a wake period of a discontinuous receive (DRx) cycle. At 1104, the UE may extend the wake period to monitor for a second KA signal, in response to the determination.

Figure 12:
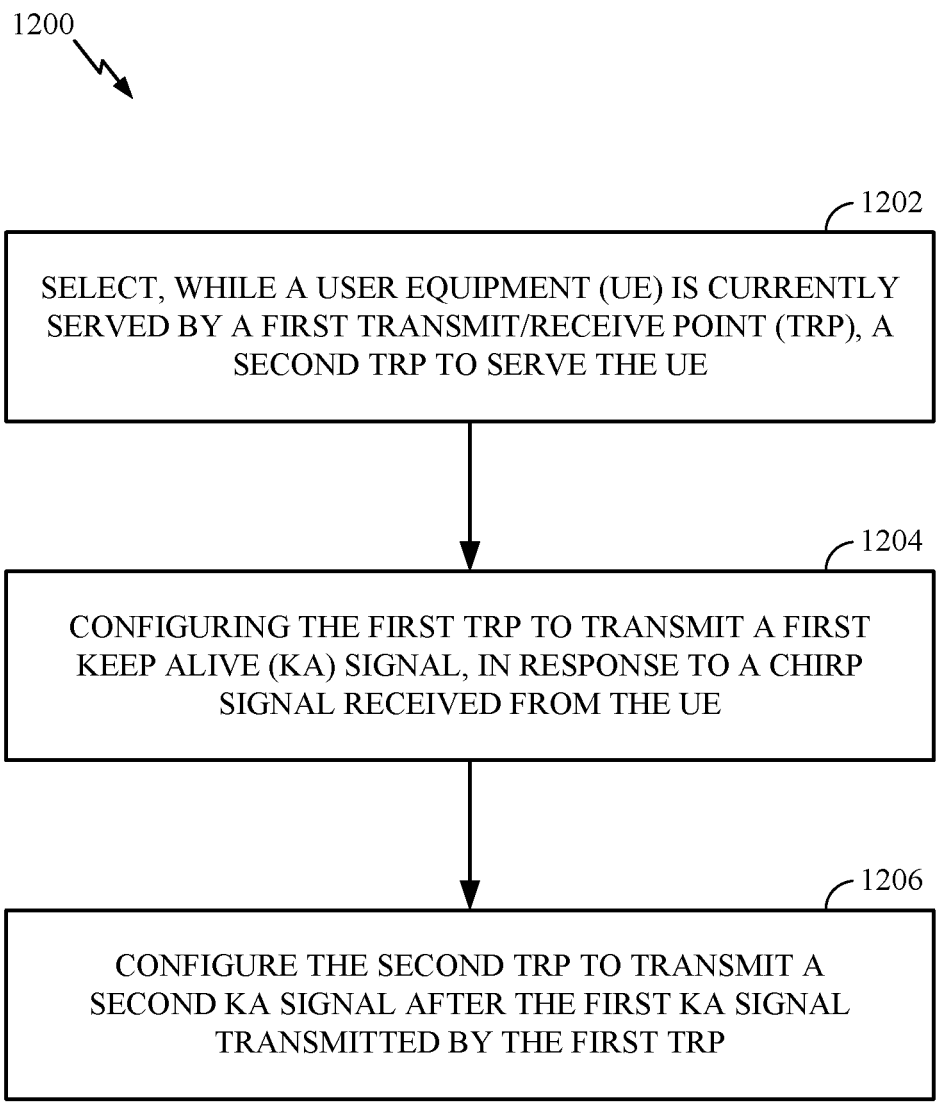
FIG. 12 illustrates example operations, which may be performed by an access network controller (ANC), in accordance with aspects of the present disclosure.

FIG. 12 illustrates example operations 1200, which may be performed by an access network controller (ANC), in accordance with aspects of the present disclosure. The ANC may include or more components such as those illustrated in FIG. 4. According to an example, one or more antenna, demod/mod, processors, and/or controller/processors at the ANC may be configured to perform the described steps.

At 1202, the UE may be served by a first transmit/receive point (TRP) and the ANC may select a second TRP to serve the UE. At 1204, the ANC may configure the first TRP to transmit a first keep alive (KA) signal, in response to a chirp signal received from the UE. At 1206, the ANC may configure the second TRP to transmit a second KA signal, wherein the second KA signal is transmitted after the first KA signal transmitted by the first TRP.

Figure 13:
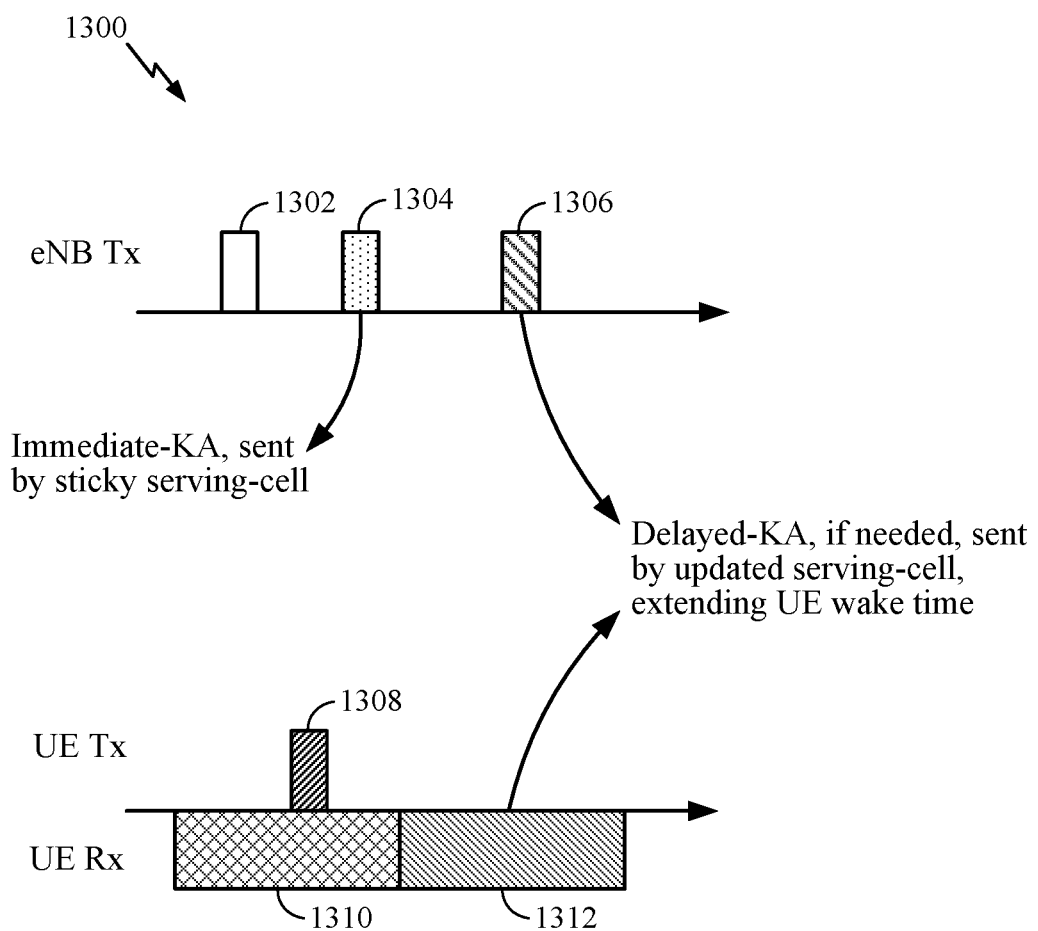
FIG. 13 illustrates an example of saving energy at a UE, in accordance with aspects of the present disclosure.

FIG. 13 illustrates an example 1300 of saving energy at a UE, according to aspects of the present disclosure. At 1302, a TRP may transmit a zone synchronization signal. At 1308, the UE may transmit a chirp signal. At 1304, a last serving TRP (the previous serving TRP) of the UE may transmit a first, immediate KA. The last (or previous) serving TRP may be referred to as a "sticky serving cell."

At 1306, if needed, an updated serving TRP of the UE may transmit a second, delayed KA. A UE may be configured with a schedule for immediate and delayed KAs. The network and UE may work together to decide on the timings of the immediate and delayed KAs. Thus, the UE and the network may agree upon the timing occasions regarding when the immediate and delayed KAs are to be transmitted by the TRPs/received by the UEs. Therefore, if a UE does not receive the immediate KA (e.g., at the configured time, in accordance with the schedule), it may extend its wake cycle 1310. Therefore, as illustrated in FIG. 13, the wake cycle 1310 may be extended to include a wake period 1312.

If the UE receives the first KA 1304 (e.g., at the configured time), the UE may not extend the wake cycle 1310. When a UE receives the first KA, the second KA 1306 may not be transmitted because, for example, the serving TRP for the UE has not changed.

Thus, when the UE is handed over from a serving TRP to an updated (e.g., target) TRP, the UE may have two opportunities to receive a KA. The UE may receive scheduled occasions for the first and second KA signals. The UE may determine it has failed to decode the first KA signal based, at least in part, on the received scheduled occasions. The timings of the scheduled occasions for the first and second KA signals may be configured by the network and UE collectively, such that the UE and the network may agree on the timings for the first and second KAs.

In DL-based mobility, a UE may take measurements of reference signals transmitted by serving and neighboring TRPs. The UE may re-select a serving TRP when a neighboring TRP transmits signals with high signal strength. For example, the UE may re-select a serving TRP when signals from a neighboring TRP are stronger than signals from a currently-serving TRP. Thus, in DL-based mobility, cell re-selection may be used by the UE to infer the UE's mobility mode (e.g., if the UE is stationary or mobile).

In UL-based mobility, serving cell handoffs are decided by the network and are transparent to the UE. Accordingly, the UE may not be able to infer its mobility based on cell re-selection. According to aspects, a UE may use the first, immediate KA and second, delayed KA to infer its mobility. For example, when the UE's serving cell has changed, the network will transmit a second, delayed KA in additional the first, immediate KA. Therefore, a UE may infer its mobility based, at least in part, on a rate of receiving the second KA. For example, the UE may infer it is being handed-over more frequently based on a high rate of needing to decode the second KA. This is because whenever the serving cell is changed, the network may transmit the additional, delayed KA (in addition to the immediate KA).

Similarly, the UE may use a miss rate of the first, immediate KA as a measure of the UE's mobility. For example, if the UE is moving, the rate of missing the first KA may increase, as the UE may be moving away from its previous (e.g., sticky) serving cell. The UE may take one or more actions based on its inferred mobility. For example, the UE may take actions to save power when the UE infers it is in a low-mobility state. According to an example, the UE may be in a low mobility state when it has a high rate of reception of the first KA or a low miss-rate of the first KA. The UE may determine if the rate of reception or rate of missing a KA is high or low based on comparison to threshold values. The network may configure UEs with these threshold values.

As described herein, a network may help a UE conserve energy by providing two KA signals when the UE hands-off UE from one TRP to another TRP. The immediate KA may be transmitted by the sticky serving cell (e.g., the last serving TRP of the UE). If UE is able to detect and decode the first KA, it may go back to sleep.

The ANC may select a new updated serving TRP for the UE. If so, the updated serving cell may transmit a second, delayed KA. If UE is unable to detect the first, immediate KA, it will have a second chance at detecting the KA when it is transmitted by the updated serving TRP. The updated TRP may be closer to the UE.

Additionally, the UE may advantageously use the immediate and delayed KA to infer its mobility mode. When the network changes the serving cell, there will be two KA's (an immediate one from the sticky serving cell and a delayed one from the new serving cell). A UE may infer its HO rate, and hence mobility mode, based on the rate of received first and second KAs. As described above, the UE may receive a configuration and/or schedule for the first and second KAs. For example, the UE may receive a time schedule and configuration of the scheduled KAs. Accordingly, the UE may be able to determine when it has missed a first or second KA.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to aspects, the described means, including, for example, the means for determining, means for extending, means for receiving, and means for taking one or more actions may be performed by one or more of antennas 452, Tx/Rx 454, processors 458, 464, 466, and/or controller/processor 480 of the UE 120. The means for selecting, means for configuring, means for receiving, means for transmitting, and means for determining may be performed by an ANC including one or more antenna, Tx/Rx, processors, and/or controller/processors similar to those illustrated in FIG. 4.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
 determining the UE has failed to decode a first keep alive (KA) signal, from a first transmit/receive point (TRP), during a wake period of a discontinuous receive (DRx) cycle; and
 extending the wake period to monitor for a second KA signal, from a second TRP, in response to the determination.

2. The method of claim 1, further comprising:
 receiving scheduled occasions for the first and second KA signals, wherein the determining comprises determining the UE has failed to decode the first KA signal based, at least in part, on the received scheduled occasions.

3. The method of claim 1, further comprising:
 determining, with a network entity, scheduled occasions for the first and second KA signals, wherein determining the UE has failed to decode the first KA signal is based, at least in part, on the determined scheduled occasions.

4. The method of claim 1, further comprising:
 determining the UE has been handed over from the first TRP to the second TRP based, at least in part, on receiving the second KA signal.

5. The method of claim 1, further comprising:
 determining a mobility state associated with the UE based, at least in part, on a rate of received first KA signals.

6. The method of claim 5, wherein:
 determining the mobility state comprises determining the UE is in a low mobility state; and
 the method further comprises taking one or more actions to save power at the UE in response to the determination of the mobility state.

7. A method for wireless communication by an access network controller (ANC), comprising:
 selecting, while a user equipment (UE) is currently served by a first transmit/receive point (TRP), a second TRP to serve the UE;
 configuring the first TRP to transmit a first keep alive (KA) signal, in response to a chirp signal received from the UE; and
 configuring the second TRP to transmit a second KA signal after the first KA signal transmitted by the first TRP.

8. The method of claim 7, further comprising:
 receiving, from the first and second TRPs, measurement reports indicating a signal strength associated with the chirp signal,
 wherein the selecting occurs in response to the measurement reports.

9. The method of claim 7, further comprising:
 transmitting, to the UE, an indication of scheduled occasions for the first and second KA signals.

10. The method of claim 9, further comprising:
 determining the scheduled occasions for the first and second KA signals, wherein the transmitting is in accordance with the determination.

11. An apparatus for wireless communication, comprising:
 at least one processor configured to:
  determine the apparatus has failed to decode a first keep alive (KA) signal, from a first transmit/receive point (TRP), during a wake period of a discontinuous receive (DRx) cycle; and
  extend the wake period to monitor for a second KA signal, from a second TRP, in response to the determination; and
 a memory coupled to the at least one processor.

12. The apparatus of claim 11, wherein:
the at least one processor is configured to receive scheduled occasions for the first and second KA signals; and
the determining comprises determining the apparatus has failed to decode the first KA signal based, at least in part, on the received scheduled occasions.

13. The apparatus of claim 11, wherein:
the at least one processor is configured to determine, with a network entity, scheduled occasions for the first and second KA signals; and
determining the apparatus has failed to decode the first KA signal is based, at least in part, on the determined scheduled occasions.

14. The apparatus of claim 11, wherein the at least one processor is configured to determine the apparatus has been handed over from the first TRP to the second TRP based, at least in part, on receiving the second KA signal.

15. The apparatus of claim 11, wherein the at least one processor is configured to determine a mobility state associated with the apparatus based, at least in part, on a rate of received first KA signals.

16. The apparatus of claim 15, wherein:
determining the mobility state comprises determining the apparatus is in a low mobility state; and
the at least one processor is configured to take one or more actions to save power at the apparatus in response to the determination of the mobility state.

17. An apparatus for wireless communication, comprising:
at least one processor configured to:
select, while a user equipment (UE) is currently served by a first transmit/receive point (TRP), a second TRP to serve the UE;
configure the first TRP to transmit a first keep alive (KA) signal, in response to a chirp signal received from the UE; and
configure the second TRP to transmit a second KA signal after the first KA signal transmitted by the first TRP; and
a memory coupled to the at least one processor.

18. The apparatus of claim 17, wherein the at least one processor is configured to:
receive, from the first and second TRPs, measurement reports indicating a signal strength associated with the chirp signal, wherein the selecting occurs in response to the measurement reports.

19. The apparatus of claim 17, wherein the at least one processor is configured to:
transmit, to the UE, an indication of scheduled occasions for the first and second KA signals.

20. The apparatus of claim 19, wherein the at least one processor is configured to:
determine the scheduled occasions for the first and second KA signals, wherein the transmitting is in accordance with the determination.

* * * * *